United States Patent
Chakra et al.

(10) Patent No.: US 10,333,885 B2
(45) Date of Patent: Jun. 25, 2019

(54) SYSTEM FOR POST SELF AWARENESS

(71) Applicant: International Business Machines Corporation, Armonk, NY (US)

(72) Inventors: Al Chakra, Apex, NC (US); Anuradha D. Chitta, Bangalore (IN); Liam S. Harpur, Skerries (IE); Soumitra G. Limaye, Pune (IN); Ranjit S. Rai, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 544 days.

(21) Appl. No.: 14/754,202

(22) Filed: Jun. 29, 2015

(65) Prior Publication Data

US 2016/0380951 A1    Dec. 29, 2016

(51) Int. Cl.
*H04L 12/58* (2006.01)

(52) U.S. Cl.
CPC .............. *H04L 51/32* (2013.01); *H04L 51/02* (2013.01)

(58) Field of Classification Search
CPC ................................ H04L 51/32; H04L 51/30
See application file for complete search history.

(56) References Cited

U.S. PATENT DOCUMENTS

| | | | |
|---|---|---|---|
| 8,965,874 B1 | 2/2015 | Vassilakis et al. | |
| 9,380,013 B1* | 6/2016 | Cashmore | ............... H04L 51/10 |
| 2009/0049018 A1 | 2/2009 | Gross | |
| 2010/0100537 A1* | 4/2010 | Druzgalski | ............. G06Q 30/02 707/713 |
| 2012/0185544 A1* | 7/2012 | Chang | .................... G06Q 50/01 709/206 |
| 2012/0271805 A1 | 10/2012 | Holenstein et al. | |
| 2013/0091147 A1* | 4/2013 | Kim | .................. G06F 17/30663 707/748 |
| 2014/0088944 A1* | 3/2014 | Natarajan | .............. G06Q 30/02 703/13 |
| 2014/0214830 A1* | 7/2014 | Fischer | ............. G06F 17/30867 707/736 |
| 2015/0169587 A1* | 6/2015 | Silverman | ........... G06F 17/3053 707/751 |

OTHER PUBLICATIONS

Author Unknown, User Content Submission Relevancy Analysis and Suggestion System, Technical Disclosure: IPCOM000226473D, Apr. 4, 2013, pp. 1-2, IP.com, Published online at: https://priorart.ip.com/IPCOM/000226473.

* cited by examiner

*Primary Examiner* — Nicholas R Taylor
*Assistant Examiner* — Sanjoy Roy
(74) *Attorney, Agent, or Firm* — Lee Law, PLLC; Christopher B. Lee

(57) ABSTRACT

A social network post subject area of a social network post is identified using text analysis. A longevity of social network posts related to the social network post subject area on each of multiple hosting platforms is determined using monitored multi-platform post-longevity information. A hosting platform with a determined highest longevity of the related social network posts is recommended from among the multiple hosting platforms. Responsive to user approval of the recommended hosting platform, the social network post is posted to the recommended hosting platform with the determined highest longevity of the related social network posts.

20 Claims, 4 Drawing Sheets

SYSTEM FOR POST SELF AWARENESS

BACKGROUND

The present invention relates to social network posts. More particularly, the present invention relates to autonomous social network post longevity and access improvement.

Users of social networks may generate social network posts. The social network posts may include information that is of interest to the user that generates the respective social network posts. The social network posts may be viewed by other social network users.

SUMMARY

A method includes identifying, by a processor using text analytics, a social network post subject area of a social network post; determining, using monitored multi-platform post-longevity information, a longevity of social network posts related to the social network post subject area on each of multiple hosting platforms; recommending, from among the multiple hosting platforms, a hosting platform with a determined highest longevity of the related social network posts; and posting, responsive to user approval of the recommended hosting platform, the social network post to the recommended hosting platform with the determined highest longevity of the related social network posts.

A system that performs the method and a computer program product that causes a computer to perform the method are also described.

DETAILED DESCRIPTION

Figure 1:
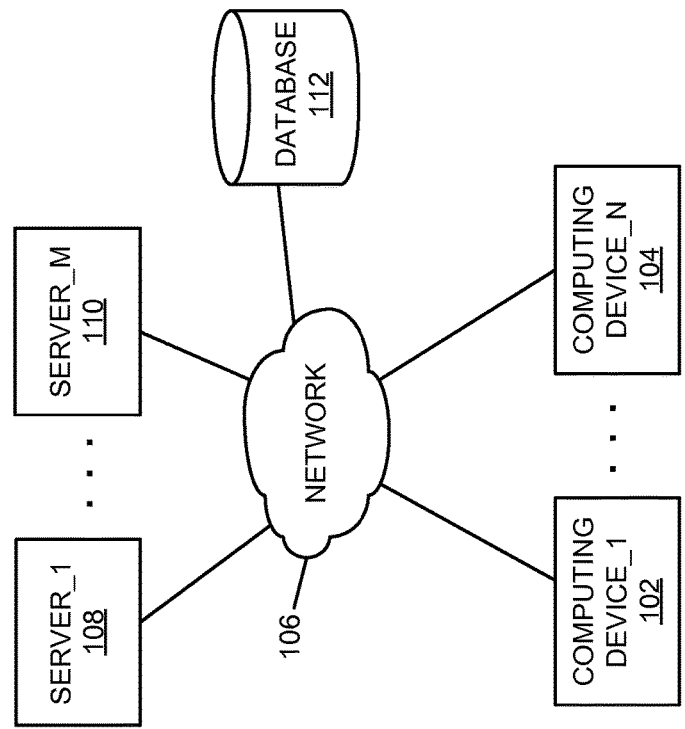
FIG. 1 is a block diagram of an example of an implementation of a system for autonomous social network post longevity and access improvement according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides a system for post self-awareness (alternatively termed "autonomous social network post longevity and accessibility improvement" herein). The present technology solves a recognized social network post publication access limitation and post removal problem by providing technology that includes a new form of social network computing server/device that evaluates several factors related to post longevity and accessibility (e.g., reach of post) across multiple social networks and that performs computational processing within these complex computing environments to selectively publish and move social network posts to improve social network post longevity and user access. As such, the technology described herein solves a problem that has resulted from the complexity of online interaction and varied online interaction platforms themselves.

The technology described herein operates by identifying a social network post subject area of a social network post using text analytics. Using monitored multi-host post-longevity information, a longevity of social network posts related to the social network post subject area on each of multiple hosting platforms is determined. From among the multiple hosting platforms, one or more hosting platforms with a determined highest longevity (or set of longevities) of the related social network posts is recommended. Responsive to user approval of the recommended hosting platform, the social network post is posted to the recommended hosting platform(s) with the determined highest longevity of the related social network posts.

The terms "social network" and "platform" are used interchangeably herein to represent diverse online communication platforms (e.g., forums, websites, blogs, etc.) that provide users and organizations with an ability to connect with one another, share and locate expertise, and communicate information. As such, it is understood that a reference to one of these terms serves as a reference any suitable online communication platform, including new online communication platforms that may be developed over time.

The technology described herein operates by analysis of multiple social networks/platforms to determine social network post decay rates over time (e.g., how long do posts of a particular type persist before being removed/deleted). The decay rates for the multiple platforms may be categorized according to the topic of the post, according to other social network user interest in and responses to posts, and other factors as appropriate for a given implementation.

Related content is monitored over an extended period of time across multiple sites/platforms to deduce the decay rate, and the access rate and availability of certain types of interest-related information. For example, a topic related to "messaging systems" may be defined to indicate that related content is to be identified and tracked over time across multiple online communication platforms to find the platform that is best at keeping that type of information active for longer periods of time. Optionally, a point-in-time analysis may be performed to ascertain how long the particular type/item of content was on the particular platform by checking the creation/modification dates in the markup language used by the platform (e.g., hypertext markup language (HTML), etc.). Alternatively, creation dates of links that link to that content may be ascertained and/or estimated (e.g., if all links to content "x" were created after July 2004, then a determination may be made that the creation date for content "x" was prior to or during July 2004 because the content would have to be published prior to creation of the links to the content "x"). By use of these types of techniques, the technology described herein may rank different online platforms according to posting duration and decay rates of different categories of content.

When an initial creation of a new post by a social network user in a given topic area is detected, the technology described herein analyzes the different online platforms and the respective posting durations and decay rates to determine which hosting platform(s) are likely to maintain the new post over a longer period of time relative to other platforms. The technology provides one or more recommended initial platforms in which to publish the new post, and the new post may be posted to one or more of the recommended platforms with the determined highest longevity or set of longevities of the related social network posts responsive to user approval of the recommended platform(s).

Once posted to a respective platform(s), the post is made self-aware that it may be in danger of removal/deletion by the platform by detecting that proximate/similar information is being removed from the respective platform. The post self-awareness may be implemented using a self-aware social network post monitoring token. The self-aware social network post monitoring token may be implemented as a coded/functional object that may monitor and move posts over time to enhance longevity and accessibility of the posts. The self-aware social network post monitoring token may be stored in association with a post on a particular platform or may monitor its assigned post(s) from a different device. The self-aware social network post monitoring token may be configured with a list of "trusted" alternative destination platforms, including other ranked platforms, and the self-aware social network post monitoring token may move the post to one or more of the trusted destination platforms. One implementation may include a "call home" feature prior to performing the move. The call home process may be used to verify the authenticity of the token and respond with credentials of the new destination platform (e.g., a user login identifier and password for the new destination platform). In response to detection that the post is in danger of removal/deletion, the post may be moved to one or more different destination platforms on which the posting may be viewed anew and on which the posting is relevant to contemporaneous interests of users that utilize the respective different platforms. As such, longevity, accessibility, and relevance of posts to users of different platforms may each be improved by use of the technology described herein.

Several components interoperate to perform the technical processing described herein. The components include a content sharing engine, a social platform analyzer component, an analytical recommendation interface, and a proximity danger component.

The content sharing engine involves the user posting/sharing the content on the recommended platform. Custom markup language tags may be created by the content sharing engine and inserted into the shared content. Alternatively, the user may additionally/alternatively add custom markup language tags. The custom markup language tags may be used to ensure that the context (e.g., taxonomy, subject matter area, etc.) of the content is understood and defined for monitoring over time using text analytics. The text analytics of various platforms in conjunction with the context of the content may be utilized to determine the most-relevant platform(s) upon which to recommend posting the content. The tags, context, and results of the text analytics may then be sent to the social analyzer component for further processing.

The social platform analyzer component uses the markup language tags and the results of the text analytics provided by the content sharing engine to identify the top (e.g., highest-ranked) platform(s) to provide projected maximized reach/access and relevancy for the respective most-socially active platforms based on closest tag matches and results from the text analytics. The identified top platforms represent one or more recommended platforms for the particular post. The recommended platform(s) may then be sent to the analytical recommendation interface.

The analytical recommendation interface provides the results received from the social platform analyzer component to the user. The analytical recommendation interface may also provide a mechanism to post/share the content directly to any of the recommended platforms that are open to public access. For recommended platforms that have closed access (e.g., that utilize authorizations or accounts for user access), the analytical recommendation interface may request access for the posting on behalf of the user by stating the relevance of the content to the users of the particular platform. In response to approval to post the content to the closed forum, the content would then be shared/posted by the analytical recommendation interface on behalf of the user.

The proximity danger component manages posting "self-awareness" for posts that have been processed as described above. Additionally, where a platform creator/owner of a particular platform excludes their platform from being analyzed by the social platform analyzer component, the proximity danger component may accommodate the privacy policies of the platform, while continuing to operate to ensure the long-term survival of the post. Self-awareness of a post may be achieved using the markup language tags in conjunction with tokens that may be associated with particular platforms to determine and provide awareness (e.g., feedback to the analytical recommendation interface) regarding whether a particular post or set of posts on a particular topic are targeted for deletion or archiving. An example self-awareness record for a post may include a record such as shown within the following Table (1).

TABLE (1)

Example Self-Awareness Record for a Post

| | |
|---|---|
| Post Identifier (ID) | 63452nb |
| Post Taxonomy | Strategic Management |
| Hosted Platform | Platform_1 |
| Creation Date | 2013 |
| Taxonomy Average Deletion/Archival Date | 2012 |
| Deletion Danger Level based upon Taxonomy | 76.3% |
| Deletion Danger Level based upon Creation Date | 89.0% |
| Deletion Danger Level based upon Location | 33.0% |
| Deletion Danger Level based upon Author | 22.0% |
| Recommendation Update | Move to Platform_2 |
| Recommendation Date | 2014 May |

As can be seen in Table (1) above, the respective post has been assigned a post identifier (ID) of "63452nb." The post ID helps with management of risks to and movement of the post over time. A post taxonomy (e.g., topic, category, etc.) is listed as "Strategic Management." A hosted platform name "Platform_1" is shown to document the current platform upon which the post is published. A creation date is shown to be "2013." A taxonomy average deletion/archival date is shown to be "2012," and represents the average posting date of posts within this particular taxonomy that have been observed/detected to have been archived and/or deleted from this particular platform on which the tracked post is published. The taxonomy average deletion/archival date may be used to assess risk of archival or deletion of this particular post as the taxonomy average deletion/archival date approaches the creation date of the post (currently still a year remaining in view of the average deletion/archival date for the taxonomy). However, because the average provides no guarantee and for purposes of example it is presumed that other posts in this same subject area/taxomony with creation dates in "2013" may have been determined to have been deleted and/or archived from the platform, a calculated deletion danger level is provided that refines the risk based upon the taxonomy. The deletion danger level based upon taxonomy is shown to be seventy six and three tenths percent (76.3%). Similarly, a deletion danger level based upon creation date is shown to be eighty nine percent (89%). A deletion danger level based upon location (e.g., the hosted platform) is shown to be thirty three percent (33%).

For purposes of example, it is presumed that posts from the particular author of the post have been determined on this particular platform to be referenced by users for a considerable time after the creation date relative to other posts from other authors in the particular taxonomy. As such, even though the deletion danger relative to taxonomy and the deletion danger relative to creation date are each relatively high, a deletion danger level based upon author is shown to be relatively low at twenty two percent (22%).

In view of this set of information and risk evaluation metrics, an informed recommendation for autonomous social network post longevity and access improvement may be provided. Within the present example, a risk-informed recommendation update is shown to recommend moving the posting (Move to Platform_2) on a recommendation date of "2014 May." For purposes of example, the recommendation date may be a future date on which the recommendation to move the post is suggested or may be a current date based upon the respective deletion risks related to the particular post.

As such, the technology described herein provides an analytical approach for improving access to and longevity of posts that solves a problem that results from the very nature of the complex Internet domain. The technology described herein may assist with ensuring that information that is of relevance to other social network users remains accessible and is posted in locations where the users that find the information relevant communicate about and share the information.

It should be noted that conception of the present subject matter resulted from recognition of certain limitations associated with access over time to social network posts. For example, it was observed that there are many platforms that provide users and organizations with an ability to connect with one another, share and locate expertise, and communicate information. It was additionally observed that when people share content/knowledge within a social network, they want to have this content shared with the most relevant people on the most effective and relevant social network(s) such that there will be maximum reach to other users and maximum impact of the information they are trying to share. However, it was determined that users primarily limit their content postings to familiar platforms, and such postings are not ensured to reach other users to which the content is relevant over time. Additionally, when a user generates a social network post to an online communication platform, they have no control over the duration of time that the posting will be accessible by other users, and they have limited knowledge of whether other users on a particular platform will find the posting relevant to other user's interests. For example, a blog or forum owner or administrator may clear out posts related to a particular topic, tag, or keyword (e.g., a topic or keyword of "messaging systems," etc.) on the respective platform that are older than a particular time period (e.g., six months, twelve months, etc.). This impacts the longevity and accessibility of a post. Once a post is cleared out, the information is lost and unavailable to social network users. It was determined that new technology that leverages information from social networks over time (e.g., decay rates of particular topics, user responses to and interest in postings, etc.) to identify appropriate initial social networks within which to post a particular topic, and to move posts over time if a more suitable platform is later identified may increase relevance, longevity, and accessibility of social network posts. It was further determined that identifying highly-relevant platforms within which to perform the initial posting and move posts over time as user interests change may reduce memory consumption on social network platforms by avoiding storage of posts that are either not relevant or that are no longer relevant on a particular platform. The present subject matter improves social network post longevity and access/impact by providing for social network targeting and movement among social networks, as described above and in more detail below. As such, improved social network post longevity and reach may be obtained through use of the present technology.

The autonomous social network post longevity and access improvement described herein may be performed in real time to allow prompt programmatic evaluation of various social network post decay factors and performance of actions to improve longevity and reach of social network posts. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for autonomous social network post longevity and access improvement. A computing device_1 102 through a computing device_N 104 communicate via a network 106 with several other devices. The other devices include a server_1 108 through a server_M 110. A database 112 may be utilized by any of the devices within the system 100 for storage of information, such as content posts to one or more social networks/platforms.

As will be described in more detail below in association with FIG. 2 through FIG. 4, the computing device_1 102 through the computing device_N 104 and the server_1 108 through the server_M 110 may each provide automated autonomous social network post longevity and access improvement. The automated autonomous social network post longevity and access improvement is based upon analysis of longevity of content posts on multiple social networks/platforms over time to determine decay rates/longevity of postings in particular categories. The analysis of decay rates/longevity of content posts is used in association with analysis of new posts to identify one or more recommended platforms on which to publish the post, or to which to move the post, to ensure that the post survives (is accessible) and is posted in a relevant location (relevant) for as long of a time (longevity) as is appropriate for a particular post. The present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of receiving or providing data (e.g., posts) for consumption by a device, such as the computing device_1 102 through the computing device_N 104, via a network, such as the network 106. As such, the server_1 108 through the server_M 110 may each include a web server, an application server, a social network server, a forum server, a blog server, or other data server device.

The database 112 may include a relational database, an object database, or any other storage type of device. As such, the database 112 may be implemented as appropriate for a given implementation. Though the database 112 is illustrated as a single device for purposes of the drawing figure, it is understood that the database 112 may be implemented as multiple devices as appropriate for a given implementation.

Figure 2:
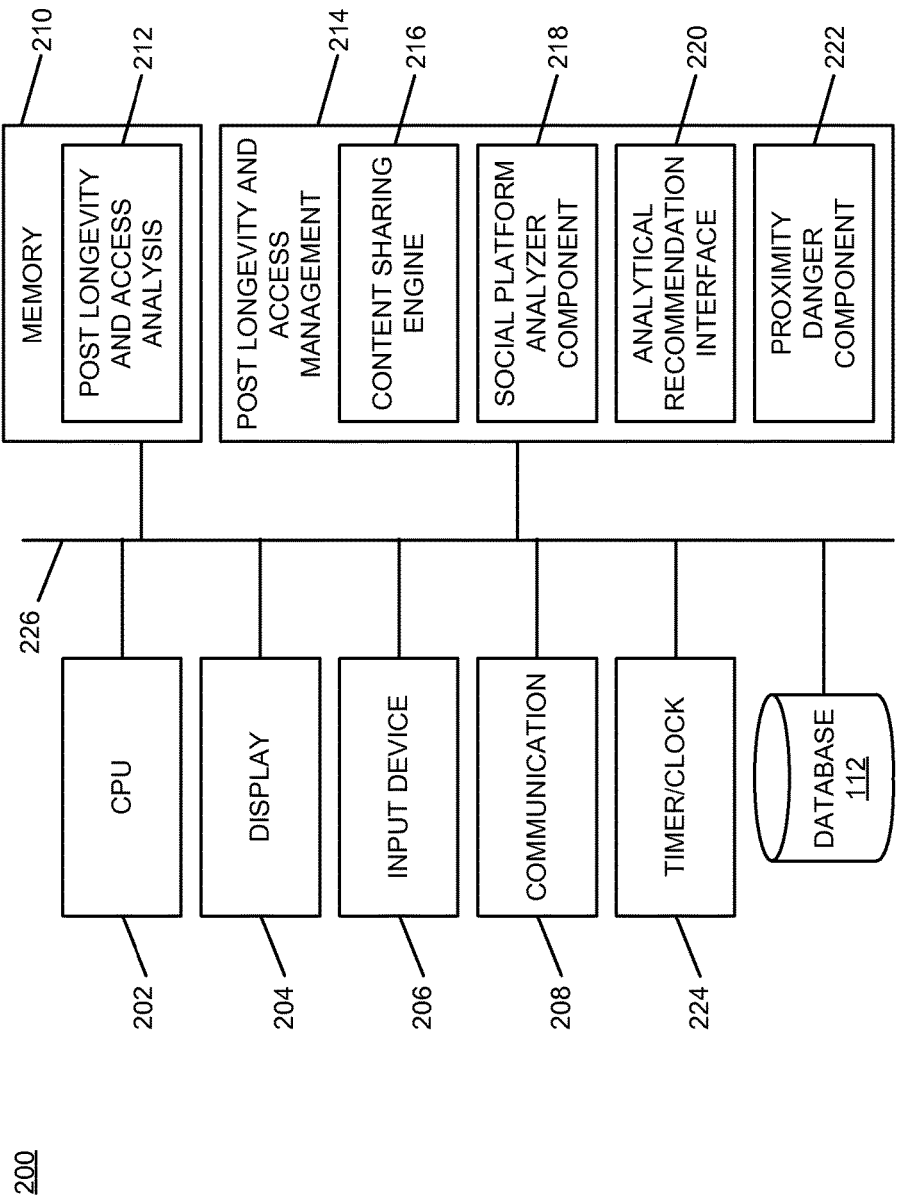
FIG. 2 is a block diagram of an example of an implementation of a core processing module capable of performing autonomous social network post longevity and access improvement according to an embodiment of the present subject matter.

FIG. 2 is a block diagram of an example of an implementation of a core processing module 200 capable of performing autonomous social network post longevity and access improvement. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of social network post longevity and access improvement in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a post longevity and access analysis storage area 212 that stores analytical information associated with social network post longevity and access management within the core processing module 200. For example, the information may include decay rates/longevity of postings in particular categories across multiple hosting platforms, analytics and taxonomy/categories of new posts and of posts that are being monitored, self-awareness records as described above, and other information as appropriate for the given implementation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A post longevity and access management module 214 is also illustrated. The post longevity and access management module 214 provides the analytical processing activities for the core processing module 200, as described above and in more detail below. The post longevity and access management module 214 implements the automated autonomous social network post longevity and access improvement of the core processing module 200.

The post longevity and access management module 214 includes several component modules, as described above. A content sharing engine 216, a social platform analyzer component 218, an analytical recommendation interface 220, and a proximity danger component 222 are illustrated, and perform the respective functions described in detail above.

It should also be noted that the post longevity and access management module 214 may form a portion of other circuitry described without departure from the scope of the present subject matter. The post longevity and access management module 214 may form a portion of an interrupt service routine (ISR), a portion of an operating system, or a portion of an application without departure from the scope of the present subject matter. The post longevity and access management module 214 may also include an embedded device with circuitry designed specifically to perform the processing described herein as appropriate for a given implementation.

A timer/clock module 224 is illustrated and used to determine timing and date information, such as monitoring and determining decay rates and risks of deletion for social network posts, as described above and in more detail below. As such, the post longevity and access management module 214 may utilize information derived from the timer/clock module 224 for information processing activities, such as the autonomous social network post longevity and access improvement described herein.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the post longevity and access management module 214, the timer/clock module 224, and the database 112 are interconnected via an interconnection 226. The interconnection 226 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
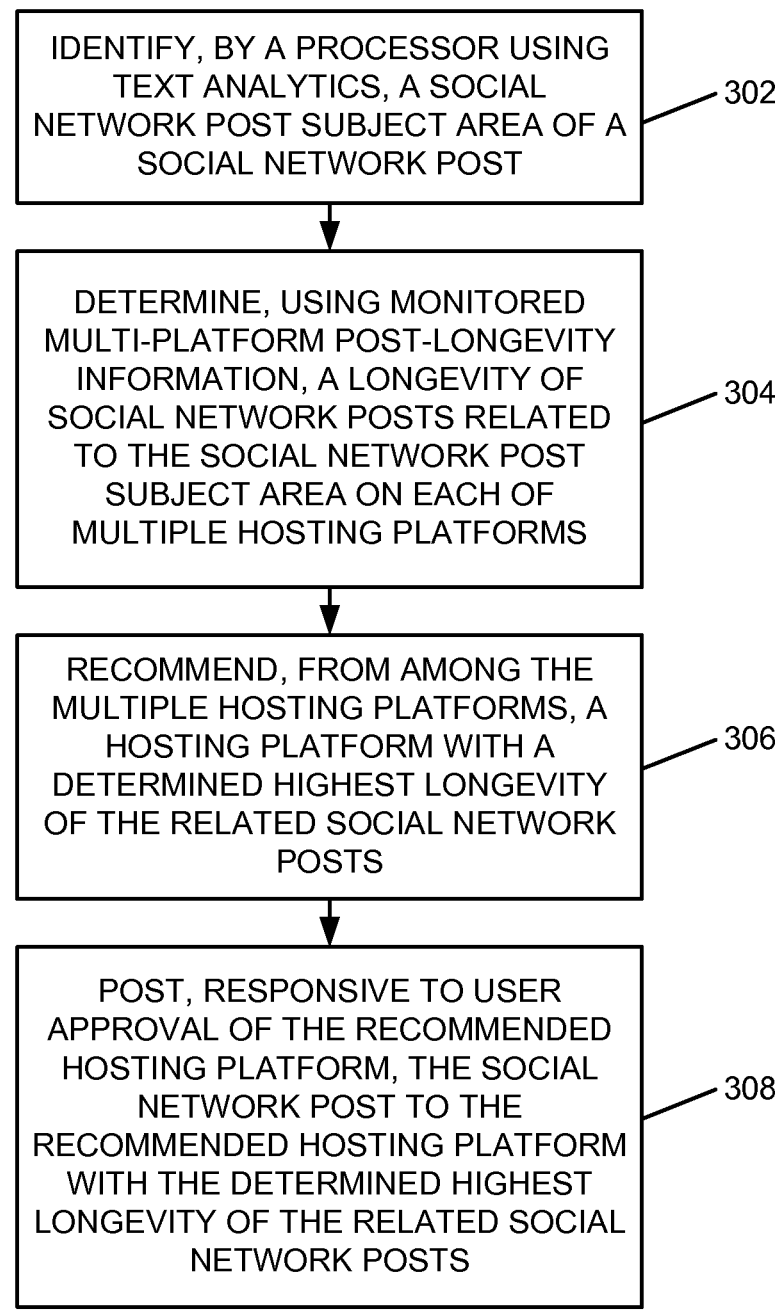
FIG. 3 is a flow chart of an example of an implementation of a process for autonomous social network post longevity and access improvement according to an embodiment of the present subject matter.
Figure 4:
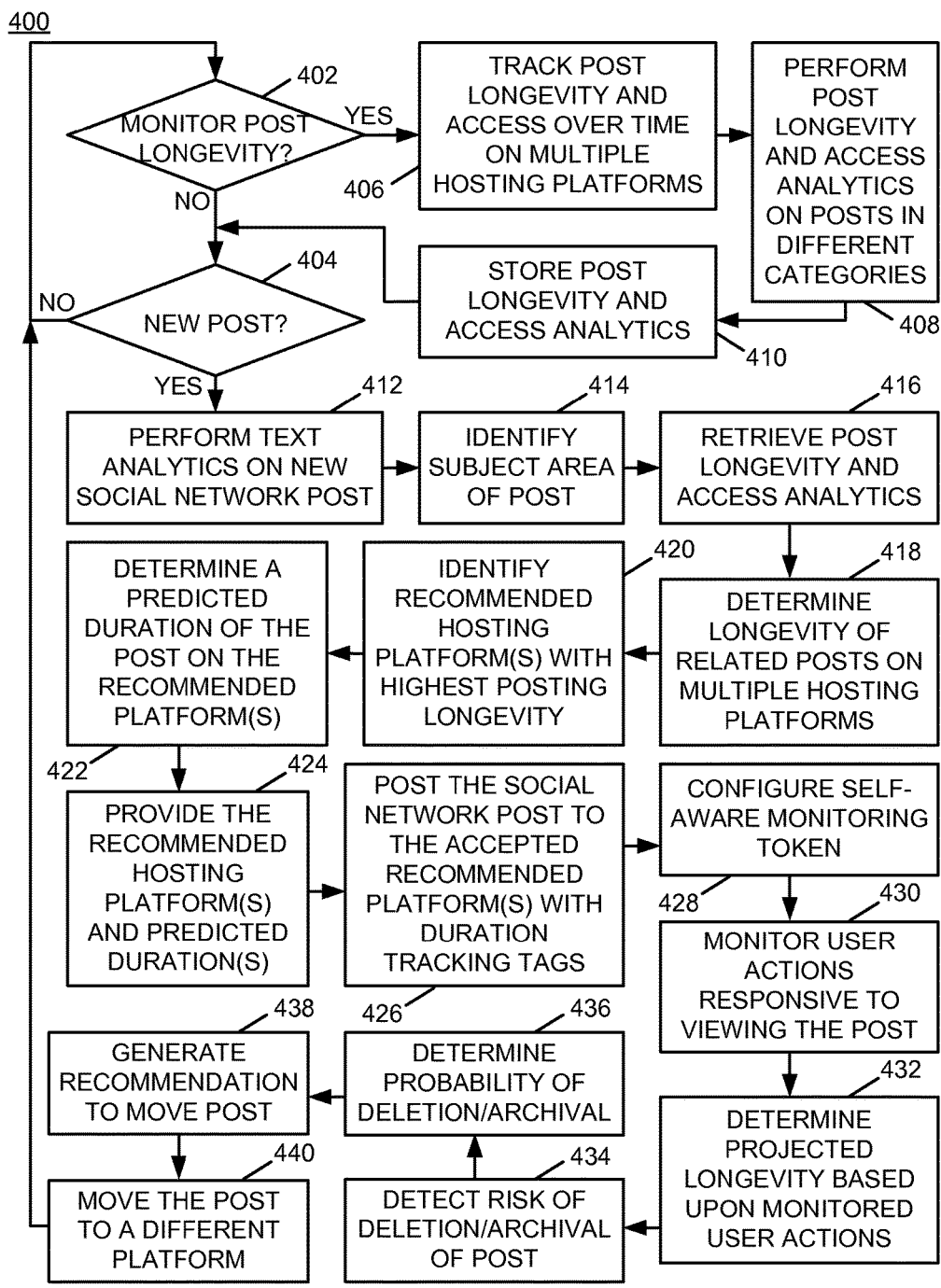
FIG. 4 is a flow chart of an example of an implementation of a process for autonomous social network post longevity and access improvement that utilizes analytics and monitoring of post access by users and moves posts over time to improve longevity and relevance of the posts according to an embodiment of the present subject matter.

FIG. 3 through FIG. 4 described below represent example processes that may be executed by devices, such as the core processing module 200, to perform the automated autonomous social network post longevity and access improvement associated with the present subject matter. Many other variations on the example processes are possible and all are considered within the scope of the present subject matter. The example processes may be performed by modules, such as the post longevity and access management module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for autonomous social network post longevity and access improvement. The process 300 represents a processor-implemented method of performing the posting platform recommendations and longevity/access management described herein. At block 302, the process 300 identifies, by a processor using text analytics, a social network post subject area of a social network post. At block 304, the process 300 determines, using monitored multi-platform post-longevity information, a longevity of social network posts related to the social network post subject area on each of multiple hosting platforms. At block 306, the process 300 recommends, from among the multiple hosting platforms, a hosting platform with a determined highest longevity of the related social network posts. At block 308, the process 300 posts, responsive to user approval of the recommended hosting platform, the social network post to the recommended hosting platform with the determined highest longevity of the related social network posts.

FIG. 4 is a flow chart of an example of an implementation of a process 400 for autonomous social network post longevity and access improvement that utilizes analytics and monitoring of post access by users and moves posts over time to improve longevity and relevance of the posts. The process 400 represents a processor-implemented method of performing the posting platform recommendations and longevity/access management described herein. At decision point 402, the process 400 makes a determination as to whether to perform monitoring of post longevity across multiple platforms to gather analytics related to different categories (e.g., topics, etc.) of posts. The monitoring of post longevity may be performed incrementally over time or may be performed in a routine (e.g., scheduled or aperiodic) manner, as appropriate for a given implementation. Affirmative processing responsive to the determination at decision point 402 will be described further below. As such, in response to determining at decision point 402 not to perform monitoring of post longevity, the process 400 make a determination at decision point 404 as to whether a new post has been detected to which post longevity analytics may be applied to create an informed recommendation regarding one or more hosting platforms that may yield the highest access and longevity for the new post. Again, affirmative processing responsive to the determination at decision point 404 will be described further below. As such, in response to determining at decision point 404 that a new post has not been detected, the process 400 returns to decision point 402 and iterates as described above. The two iterative branches of the process 400 may execute concurrently without departure from the scope of the present description.

Returning to the description of decision point 402, in response to determining to perform monitoring of post longevity across multiple platforms to gather analytics related to different categories (e.g., topics, etc.) of posts, the process 400 tracks post longevity and access over time on multiple hosting platforms at block 406. It should be noted that the tracking may be performed in a routine manner over time to allow collection of longevity and access information for multiple different posts in multiple different categories.

At block 408, the process 400 performs post longevity and access analytics on posts in different categories. At block 410, the process 400 stores the post longevity and access analytics, such as to the database 112. The process 400 returns to decision point 404 and iterates as described above.

Returning to the description of decision point 404, in response to determining that a new post has been detected to which post longevity analytics may be applied to create an informed recommendation regarding one or more hosting platforms that may yield the highest access and longevity for the new post, the process 400 performs text analytics on the new social network post at block 412. At block 414, the process 400 identifies a subject area of the post (e.g., a topic, category, etc.).

At block 416, the process 400 retrieves post longevity and access analytics that have been gathered over time from multiple hosting platforms, as described above. At block 418, the process 400 determines the longevity of related posts on multiple hosting platforms. The determined longevity may also indicate long-term accessibility of the related posts on the multiple hosting platforms. As such, the process 400 determines, using monitored multi-platform post-longevity information, longevity of social network posts related to the social network post subject area on each of multiple hosting platforms, and determines a level to which users can access related posts over time on these different hosting platforms.

At block 420, the process 400 identifies one or more recommended hosting platform(s) (e.g., websites, blogs, forums, social networks, etc.) with a highest determined posting longevity (or highest set of determined posting longevities). Again, the highest one or more recommended hosting platform(s) may be used to predict long-term accessibility of the new social network post.

At block 422, the process 400 determines a predicted duration of the post on the recommended platform(s). The process 400 may determine a predicted posting duration of the social network post on the recommended platform(s) in accordance with a decay rate of the related social network posts on the recommended platform(s).

At block 424, the process 400 provides the recommended hosting platform(s) and predicted post duration(s). As such, the process 400 may provide the predicted posting duration of the social network post with the recommendation of the hosting platform(s) with the determined highest longevity of the related social network posts. The recommendation(s) and duration(s) may be provided to the user, and the user may accept one or more of the recommended hosting platforms. For purposes of the present description, it is assumed that the user selects at least one of the recommended platforms. This interaction is not illustrated within FIG. 4 to avoid additional crowding in the drawing, though this processing is considered a part of the process 400.

At block 426, the process 400 posts the social network post to the accepted recommended platform(s) with duration tracking tags incorporated into the social network post. As described above, the duration tracking tags may be programmatically added by the process 400 or may be added by the user. This additional processing is also considered a part of the process 400 and again is not illustrated to avoid additional crowding in the drawing.

At block 428, the process 400 configures a self-aware monitoring token. As described above, the process 400 may configure a self-aware social network post monitoring token that monitors social network user actions related to the social network post. The self-aware social network post monitoring token may be implemented as a coded/functional object that may monitor and move posts over time to enhance longevity and accessibility of the posts. At block 430, the process 400 monitors social network user actions responsive to viewing the social network post on the recommended platform(s), and may monitor one or more hosting platforms according to where the post was posted.

At block 432, the process 400 determines a projected longevity of the social network post on the recommended platform(s) based upon the monitored social network user actions. The process 400 may also update the predicted duration accordingly. At block 434, the process 400 detects, by the self-aware social network post monitoring token, a risk of one of deletion of and archiving of the social network post from one or more of the recommended platform(s).

At block 436, the process 400 determines a probability of deletion or archiving of the post on one or more of the platform(s). The process 400 may determine the probability of one of deletion of and archiving of the social network post at the recommended platform based upon the subject area, posting date, author, and other factors as appropriate for the given implementation.

At block 438, the process 400 generates a recommendation to move the post to one or more new hosting platforms. The process 400 may generate the recommendation to move the social network post from the recommended platform to a different platform responsive to detection by a self-aware social network post monitoring token of a risk of one of deletion of and archiving of the social network post, as described above. The recommendation to move the post may be based upon additional iterations of the longevity and access analytics described above. As described above, the two iterative branches of the process 400 may execute concurrently without departure from the scope of the present description. As such, updated analytics may be made available over time during monitoring and recommendation analysis of the social network post.

At block 440, the process 400 moves, by the self-aware social network post monitoring token responsive to detection of a risk of one of deletion of and archiving of the social network post from the recommended platform, the social network post to a different hosting platform. The process 400 returns to decision point 402 and iterates as described above.

As such, the process 400 performs analytics over time to build an analytical database of post durations in different categories and across different hosting platforms. The process 400 leverages this continuously-integrated analytical information to provide recommendations of hosting platforms for new posts to ensure a higher probability of post duration, thereby aligning information interests of social network users and improving relevance of the available content to those social network users. The process 400 also detects risks and probabilities of deletions over time on hosting platforms and moves the social network post to different hosting platforms over time, again to ensure a higher probability of post duration, again aligning information interests of social network users and improving relevance of the available content to those social network users.

As described above in association with FIG. 1 through FIG. 4, the example systems and processes provide autonomous social network post longevity and access improvement. Many other variations and additional activities associated with autonomous social network post longevity and access improvement are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
by a post longevity and access management processor that provides automated social network post access improvement:
configuring, in response to detecting a new social network post and as an improvement to computer-based post access, the social network post as a self-aware social network post that comprises functional code that prevents its own deletion by initiating movement of the self-aware social network post to one or more different hosting platforms in response to detection of a probability of deletion of the self-aware social network post;
identifying, using text analytics, a social network post subject area of the self-aware social network post;
determining, using subject area publication duration information programmatically gathered by monitoring publication durations of social network posts on multiple hosting platforms over time, an average duration of time that social network posts related to the social network post subject area of the self-aware social network post remain published on each of the respective multiple hosting platforms before being removed from being hosted;
recommending, from among the multiple hosting platforms, a hosting platform with a determined longest average duration of time that the social network posts related to the social network post subject area of the self-aware social network post remain published before being removed from being hosted; and
programmatically posting, responsive to user approval of the recommended hosting platform, the self-aware social network post to the recommended hosting platform with the determined longest average duration of time that the social network posts related to the social network post subject area of the self-aware social network post remain published before being removed from being hosted.

2. The method of claim 1, further comprising the post longevity and access management processor:
determining a predicted posting duration of the self-aware social network post on the recommended hosting platform in accordance with a decay rate that specifies how long the social network posts related to the social network post subject area of the self-aware social network post remain published on the recommended hosting platform before being removed from being hosted; and
providing the predicted posting duration of the self-aware social network post with the recommendation of the hosting platform.

3. The method of claim 1, further comprising the post longevity and access management processor:
programmatically incorporating, into the self-aware social network post, a publishing duration tracking tag that comprises a self-awareness record that tracks duration of publication of the self-aware social network post and platform posting statistics of the recommended hosting platform with respect to the social network post subject area of the self-aware social network post;
monitoring, by use of the incorporated publishing duration tracking tag, social network user actions over time responsive to viewing the self-aware social network post on the recommended hosting platform;
determining a projected remaining posting duration of the self-aware social network post on the recommended hosting platform based upon each as tracked by the incorporated publishing duration tracking tag: (i) changes of the monitored social network user actions over time and (ii) an updated posting duration and taxonomy average deletion date for the social network post subject area of the self-aware social network post; and
initiating, by the self-aware social network post, movement of the self-aware social network post to a different hosting platform in response to determining that the projected remaining posting duration of the self-aware social network post on the recommended hosting platform indicates a high probability of deletion or archival of the self-aware social network post on the recommended hosting platform.

4. The method of claim 1, further comprising the post longevity and access management processor:
configuring the functional code of the self-aware social network post as a self-aware social network post monitoring token implemented as a coded functional object that (i) is stored with the self-aware social network post on the recommended hosting platform, (ii) programmatically monitors social network user actions related to the self-aware social network post and (iii) programmatically moves the self-aware social network post to different hosting platforms over time to enhance longevity and accessibility of the self-aware social network post;
detecting, by the self-aware social network post monitoring token, a risk of one of deletion of and archiving of the self-aware social network post from the recommended hosting platform; and
programmatically moving, under control of the self-aware social network post monitoring token, the self-aware social network post and the self-aware social network post monitoring token to a different hosting platform.

5. The method of claim 1, further comprising the post longevity and access management processor:
configuring the functional code of the self-aware social network post to programmatically perform a call-home verification to the post longevity and access management processor from a coded functional self-aware social network post monitoring token stored with the self-aware social network post responsive to detection of a risk of one of deletion of and archiving of the self-aware social network post from the recommended hosting platform, where the call-home verification confirms authenticity of the coded functional self-aware social network post monitoring token;
retrieving, by the coded functional self-aware social network post monitoring token responsive to the call-home verification of the authenticity of the coded functional self-aware social network post monitoring token by the post longevity and access management processor, user credentials usable to gain authorized access to a different hosting platform; and programmatically moving, by the coded functional self-aware social network post monitoring token, the self-aware social network post to the different hosting platform using the retrieved user credentials.

6. The method of claim 1, further comprising the post longevity and access management processor:
determining, using a coded functional self-aware social network post monitoring token stored as the functional code in association with the self-aware social network post, that information similar to the self-aware social network post is being removed from the recommended hosting platform and that there is a probability of risk of one of deletion of and archiving of the self-aware social network post from the recommended hosting platform based upon one or more of the social network post subject area, a posting date of the self-aware social network post, and an author of the self-aware social network post; and
programmatically posting, by the coded functional self-aware social network post monitoring token, the self-aware social network post to a different hosting platform in response to determining the probability of risk of one of deletion of and archiving of the self-aware social network post from the recommended hosting platform.

7. The method of claim 1, further comprising the post longevity and access management processor:
programmatically posting, based upon a probability of risk of one of deletion of and archiving of the self-aware social network post from the recommended hosting platform, the self-aware social network post to a different trusted alternative destination hosting platform specified within a list of trusted alternative destination hosting platforms defined within a coded functional self-aware social network post monitoring token stored as a portion of the functional code in association with the self-aware social network post; and
programmatically deleting the self-aware social network post from the recommended hosting platform responsive to posting the self-aware social network post to the different trusted alternative destination hosting platform.

8. A system, comprising:
a communication interface; and
a one or more post longevity and access management processors that provide automated social network post access improvement programmed to:
configure, in response to detecting a new social network post and as an improvement to computer-based post access, the social network post as a self-aware social network post that comprises functional code that prevents its own deletion by initiating movement of the self-aware social network post to one or more different hosting platforms in response to detection of a probability of deletion of the self-aware social network post;
identify, using text analytics, a social network post subject area of the self-aware social network post;
determine, using subject area publication duration information programmatically gathered by monitoring publication durations of social network posts on multiple hosting platforms over time, an average duration of time that social network posts related to the social network post subject area of the self-aware social network post remain published on each of the respective multiple hosting platforms before being removed from being hosted;
recommend, from among the multiple hosting platforms, a hosting platform with a determined longest average duration of time that the social network posts related to the social network post subject area of the self-aware social network post remain published before being removed from being hosted; and
programmatically post, via the communication interface responsive to user approval of the recommended hosting platform, the self-aware social network post to the recommended hosting platform with the determined longest average duration of time that the social network posts related to the social network post subject area of the self-aware social network post remain published before being removed from being hosted.

9. The system of claim 8, where the one or more post longevity and access management processors are further programmed to:
determine a predicted posting duration of the self-aware social network post on the recommended hosting platform in accordance with a decay rate that specifies how long the social network posts related to the social network post subject area of the self-aware social network post remain published on the recommended hosting platform before being removed from being hosted; and
provide the predicted posting duration of the self-aware social network post with the recommendation of the hosting platform.

10. The system of claim 8, where the one or more post longevity and access management processors are further programmed to:
programmatically incorporate, into the self-aware social network post, a publishing duration tracking tag that comprises a self-awareness record that tracks duration of publication of the self-aware social network post and platform posting statistics of the recommended hosting platform with respect to the social network post subject area of the self-aware social network post;
monitor, by use of the incorporated publishing duration tracking tag, social network user actions over time responsive to viewing the self-aware social network post on the recommended hosting platform;
determine a projected remaining posting duration of the self-aware social network post on the recommended hosting platform based upon each as tracked by the incorporated publishing duration tracking tag: (i) changes of the monitored social network user actions over time and (ii) an updated posting duration and taxonomy average deletion date for the social network post subject area of the self-aware social network post; and
initiate, by the self-aware social network post, movement of the self-aware social network post to a different hosting platform in response to determining that the projected remaining posting duration of the self-aware social network post on the recommended hosting platform indicates a high probability of deletion or archival of the self-aware social network post on the recommended hosting platform.

11. The system of claim 8, where the one or more post longevity and access management processors are further programmed to:
configure the functional code of the self-aware social network post as a self-aware social network post monitoring token implemented as a coded functional object that (i) is stored with the self-aware social network post on the recommended hosting platform, (ii) programmatically monitors social network user actions related to the self-aware social network post and (iii) programmatically moves the self-aware social network post to different hosting platforms over time to enhance longevity and accessibility of the self-aware social network post;

detect, by the self-aware social network post monitoring token, a risk of one of deletion of and archiving of the self-aware social network post from the recommended hosting platform; and programmatically move, under control of the self-aware social network post monitoring token, the self-aware social network post and the self-aware social network post monitoring token to a different hosting platform.

12. The system of claim 8, where the one or more post longevity and access management processors are further programmed to:

configure the functional code of the self-aware social network post to programmatically perform a call-home verification to the one or more post longevity and access management processors from a coded functional self-aware social network post monitoring token stored with the self-aware social network post responsive to detection of a risk of one of deletion of and archiving of the self-aware social network post from the recommended hosting platform, where the call-home verification confirms authenticity of the coded functional self-aware social network post monitoring token;

retrieve, by the coded functional self-aware social network post monitoring token responsive to the call-home verification of the authenticity of the coded functional self-aware social network post monitoring token by the one or more post longevity and access management processors, user credentials usable to gain authorized access to a different hosting platform; and programmatically move, by the coded functional self-aware social network post monitoring token, the self-aware social network post to the different hosting platform using the retrieved user credentials.

13. The system of claim 8, where the one or more post longevity and access management processors are further programmed to:

determine, using a coded functional self-aware social network post monitoring token stored as the functional code in association with the self-aware social network post, that information similar to the self-aware social network post is being removed from the recommended hosting platform and that there is a probability of risk of one of deletion of and archiving of the self-aware social network post from the recommended hosting platform based upon one or more of the social network post subject area, a posting date of the self-aware social network post, and an author of the self-aware social network post; and one of:

programmatically post, by the coded functional self-aware social network post monitoring token, the self-aware social network post to a different hosting platform in response to determining the probability of risk of one of deletion of and archiving of the self-aware social network post from the recommended hosting platform; or programmatically post, based upon the probability of risk of one of deletion of and archiving of the self-aware social network post from the recommended hosting platform, the self-aware social network post to a different trusted alternative destination hosting platform specified within a list of trusted alternative destination hosting platforms defined within the coded functional self-aware social network post monitoring token stored as a portion of the functional code in association with the self-aware social network post; and where the one or more post longevity and access management processors are further programmed to:

programmatically delete the self-aware social network post from the recommended hosting platform responsive to posting the self-aware social network post to one of the different hosting platform and the different trusted alternative destination hosting platform.

14. A computer program product, comprising:

a computer readable storage medium having computer readable program code embodied therewith, where the computer readable storage medium is not a transitory signal per se and where the computer readable program code when executed on a post longevity and access management computer that provides automated social network post access improvement causes the post longevity and access management computer to:

configure, in response to detecting a new social network post and as an improvement to computer-based post access, the social network post as a self-aware social network post that comprises functional code that prevents its own deletion by initiating movement of the self-aware social network post to one or more different hosting platforms in response to detection of a probability of deletion of the self-aware social network post;

identify, using text analytics, a social network post subject area of the self-aware social network post;

determine, using subject area publication duration information programmatically gathered by monitoring publication durations of social network posts on multiple hosting platforms over time, an average duration of time that social network posts related to the social network post subject area of the self-aware social network post remain published on each of the respective multiple hosting platforms before being removed from being hosted;

recommend, from among the multiple hosting platforms, a hosting platform with a determined longest average duration of time that the social network posts related to the social network post subject area of the self-aware social network post remain published before being removed from being hosted; and programmatically post, responsive to user approval of the recommended hosting platform, the self-aware social network post to the recommended hosting platform with the determined longest average duration of time that the social network posts related to the social network post subject area of the self-aware social network post remain published before being removed from being hosted.

15. The computer program product of claim 14, where the computer readable program code when executed on the post longevity and access management computer further causes the post longevity and access management computer to:

determine a predicted posting duration of the self-aware social network post on the recommended hosting platform in accordance with a decay rate that specifies how long the social network posts related to the social network post subject area of the self-aware social network post remain published on the recommended hosting platform before being removed from being hosted; and provide the predicted posting duration of the self-aware social network post with the recommendation of the hosting platform.

16. The computer program product of claim 14, where the computer readable program code when executed on the post longevity and access management computer further causes the post longevity and access management computer to:

programmatically incorporate, into the self-aware social network post, a publishing duration tracking tag that comprises a self-awareness record that tracks duration of publication of the self-aware social network post and platform posting statistics of the recommended hosting platform with respect to the social network post subject area of the self-aware social network post;

monitor, by use of the incorporated publishing duration tracking tag, social network user actions over time responsive to viewing the self-aware social network post on the recommended hosting platform;

determine a projected remaining posting duration of the self-aware social network post on the recommended hosting platform based upon each as tracked by the incorporated publishing duration tracking tag: (i) changes of the monitored social network user actions over time and (ii) an updated posting duration and taxonomy average deletion date for the social network post subject area of the self-aware social network post; and initiate, by the self-aware social network post, movement of the self-aware social network post to a different hosting platform in response to determining that the projected remaining posting duration of the self-aware social network post on the recommended hosting platform indicates a high probability of deletion or archival of the self-aware social network post on the recommended hosting platform.

17. The computer program product of claim 14, where the computer readable program code when executed on the post longevity and access management computer further causes the post longevity and access management computer to:

configure the functional code of the self-aware social network post as a self-aware social network post monitoring token implemented as a coded functional object that (i) is stored with the self-aware social network post on the recommended hosting platform, (ii) programmatically monitors social network user actions related to the self-aware social network post and (iii) programmatically moves the self-aware social network post to different hosting platforms over time to enhance longevity and accessibility of the self-aware social network post;

detect, by the self-aware social network post monitoring token, a risk of one of deletion of and archiving of the self-aware social network post from the recommended hosting platform; and programmatically move, under control of the self-aware social network post monitoring token, the self-aware social network post and the self-aware social network post monitoring token to a different hosting platform.

18. The computer program product of claim 14, where the computer readable program code when executed on the post longevity and access management computer further causes the post longevity and access management computer to:

configure the functional code of the self-aware social network post to programmatically perform a call-home verification to the post longevity and access management computer from a coded functional self-aware social network post monitoring token stored with the self-aware social network post responsive to detection of a risk of one of deletion of and archiving of the self-aware social network post from the recommended hosting platform, where the call-home verification confirms authenticity of the coded functional self-aware social network post monitoring token;

retrieve, by the coded functional self-aware social network post monitoring token responsive to the call-home verification of the authenticity of the coded functional self-aware social network post monitoring token by the post longevity and access management computer, user credentials usable to gain authorized access to a different hosting platform; and programmatically move, by the coded functional self-aware social network post monitoring token, the self-aware social network post to the different hosting platform using the retrieved user credentials.

19. The computer program product of claim 14, where the computer readable program code when executed on the post longevity and access management computer further causes the post longevity and access management computer to:

determine, using a coded functional self-aware social network post monitoring token stored as the functional code in association with the self-aware social network post, that information similar to the self-aware social network post is being removed from the recommended hosting platform and that there is a probability of risk of one of deletion of and archiving of the self-aware social network post from the recommended hosting platform based upon one or more of the social network post subject area, a posting date of the self-aware social network post, and an author of the self-aware social network post; and programmatically post, by the coded functional self-aware social network post monitoring token, the self-aware social network post to a different hosting platform in response to determining the probability of risk of one of deletion of and archiving of the self-aware social network post from the recommended hosting platform.

20. The computer program product of claim 14, where the computer readable program code when executed on the post longevity and access management computer further causes the post longevity and access management computer to:

programmatically post, based upon a probability of risk of one of deletion of and archiving of the self-aware social network post from the recommended hosting platform, the self-aware social network post to a different trusted alternative destination hosting platform specified within a list of trusted alternative destination hosting platforms defined within a coded functional self-aware social network post monitoring token stored as a portion of the functional code in association with the self-aware social network post; and programmatically delete the self-aware social network post from the recommended hosting platform responsive to posting the self-aware social network post to the different trusted alternative destination hosting platform.

* * * * *